Jan. 13, 1953   J. L. CLOUD ET AL   2,625,460
METHOD OF AND MEANS FOR RECORDING PHENOMENA
BY MEANS OF STANDING WAVES
Filed April 26, 1947

INVENTORS
JERRY L. CLOUD
and NATHAN MARCHAND
BY
ATTORNEY

Patented Jan. 13, 1953

2,625,460

UNITED STATES PATENT OFFICE 2,625,460

METHOD OF AND MEANS FOR RECORDING PHENOMENA BY MEANS OF STANDING WAVES

Jerry L. Cloud and Nathan Marchand, New York, N. Y., assignors, by mesne assignments, to Technicon Cardiograph Corporation, New York, N. Y.

Application April 26, 1947, Serial No. 744,228

18 Claims. (Cl. 346—74)

Our present invention relates to an oscillographic recording method and apparatus.

The primary object of this invention is to provide an oscillographic recorder which operates without mechanical inertia and which is operable to record any frequency at any length of excursion without attenuation or distortion of the record.

Another object of the invention is to provide an oscillographic recorder which is operable to produce a direct trace on the record sheet or web which may be formed of thermally sensitive paper or other material or of material which is sensitive to voltage variations.

The absence of mechanical inertia in a recorder embodying the present invention makes it possible to directly record phenomena characterized by either very high frequencies, or by very wide bands of frequencies, or by very wide bands of very high frequencies. For example, but without limitation, the recorder of the present invention is particularly advantageous for use in dynamic strain testing, which involves wide frequency ranges together with non-cyclic performance, and are therefore extremely difficult, and in some cases impossible, to record satisfactorily with present day equipment.

Briefly described, our invention comprises establishing standard waves of electrical energy, varying said wave in accordance with voltage variations from a selected source, and translating said varied standing wave of electrical energy into visual form. More specifically, in accordance with one mode of practicing our invention the standing wave of electrical energy heats the thermally sensitive material by dielectric dissipation of energy either at a preselected point in relation to the standing wave or at all points except a single point of zero energy, the standing wave pattern having a frequency modulation imposed thereon in accordance with the phenomenon which is to be recorded whereby the wave length of the standing wave is varied and the point of differentiation is correspondingly displaced. By moving the thermally sensitive record sheet or web along the line extending at right angles to the line along which the point of differentiation is displaced, a trace or graph of the voltage variation is obtained. In accordance with another mode of practicing our invention the standing wave may be of uniform or constant frequency or wave length and the point of differentiation may be displaced in relation to the record sheet or web by varying the effective length of the conductors with respect to which the standing wave is established, the variations in the effective length of said conductors being produced in accordance with the phenomenon which is to be recorded. It is to be understood however that in thus mentioning two specific modes of practicing our invention we do not wish to be limited thereto since in view of our disclosure of the underlying idea of the invention involving the use of standing waves of electrical energy in a recording apparatus and method various specific modes of practicing our invention, in addition to those herein specifically described will readily occur to skilled artisans.

Our invention will now be more particularly described with reference to the accompanying illustrative drawings in which.

Figure 1:
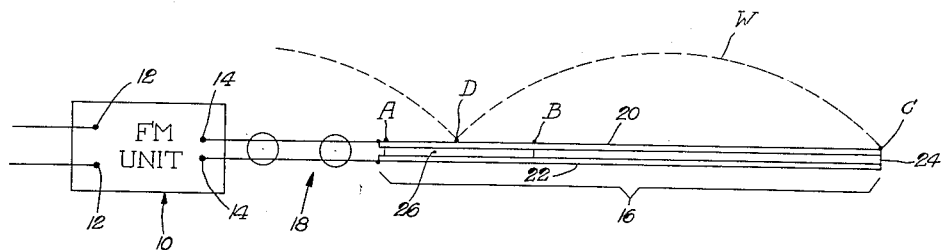
Fig. 1 is a more or less diagrammatic view illustrating one mode of practicing the invention.
Figure 4:
Fig. 4 shows an electrocardiograph record as illustrative of a record of voltage variations which may be obtained in accordance with the present invention.
Figure 3:
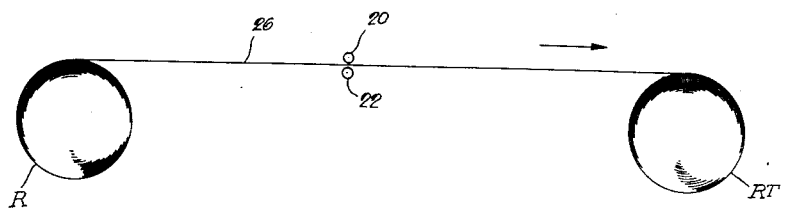
Fig. 3 is a view showing the direction of travel of the record sheet or web.

Referring now to the invention as illustrated in Fig. 1, there is provided a frequency modulation unit 10 of any suitable type. Said frequency modulation unit has a large deviation characteristic. The input terminals for the incoming signals or voltage from the phenomenon to be recorded are indicated at 12. The output terminals 14 of said frequency modulation unit 10 are connected to the recording head 16 by a coaxial cable or other suitable radio frequency transmission line 18. The recording head indicated generally at 16 comprises the spaced confronting conductors 20 and 22 which are preferably in the form of metal rods. The end of conductors 20 and 22 are short-circuited at 24. Preferably the space between conductors 20 and 22 is such that said conductors lie immediately adjacent the opposite surfaces respectively of the thermally sensitive paper or other record material 26. Any suitable type of thermally sensitive material may be used, for example, paper or other sheet material which is darkened or otherwise changes in color by the effect of heat thereon. As indicated in Fig. 3 the thermally sensitive paper may be moved from a supply roll R to a take-up roll RT at a constant speed of travel between conductors 20 and 22 transversely of the latter. The characteristic impedance of the "transmission line"

between the points A and C, the thermally sensitive material being in place as shown, should be uniform at all points along said line, in order to avoid distortion of the standing wave.

In the operation of the frequency modulation unit 10 a standing wave of electrical energy, expressed as a voltage between conductors 20 and 22 will exist along said metallic conductors from a point between A and B to the short-circuit termination at C. This standing wave is indicated in dotted lines at W and it will be noted that at the termination points of the wave the voltage falls to zero value, and that at every other point there is an energy transfer between conductors 20 and 22 by reason of this voltage. Since this energy transfer is resisted by the paper or record sheet 26, a heating effect is produced on said record sheet, and if said record sheet is moved between said conductors, as illustrated in Fig. 3, the null point or point of zero energy indicated at D, at which no heating of the record sheet 26 occurs, will result in the production of a visual line on said record sheet. By varying the frequency, and hence the wave length of the standing wave, the point of differentiation, here shown as the null point or point of zero energy, indicated at D, is displaced along the line between the points A and B, corresponding to a maximum one-half wave length between points A and C and a minimum one-half wave length between the points B and C. The length of the conductors 20 and 22 and the width of record sheet 26 may vary, but by way of example and without limitation it may be noted that for obtaining a record on sheet 26 having a width of 10 centimeters, which may be considered for the purpose of this example as the distance between points A and B (Fig. 1), the distance between B and C should be 25 centimeters for recording the displacement of the null point D of the standing wave in a range of frequencies from about 430 to about 600 megacycles. At said lower frequency of about 430 megacycles, the null point D will be at point A and at said frequency of 600 megacycles, said null point will be at B, with intermediate locations of said null point between A and B for intermediate frequencies, respectively. It will be understood that instead of utilizing the null point of the standing wave for obtaining the record on the sheet 26, the standing wave may be so constituted, for example by the introduction of suitable harmonic components, that it is sharply peaked, so that only the sharply peaked point of the standing wave will have sufficient energy to affect said record sheet whereby the trace on said sheet will be produced by displacement of said sharply peaked part of the wave, as the point of differentiation, between points A and B.

Figure 2:
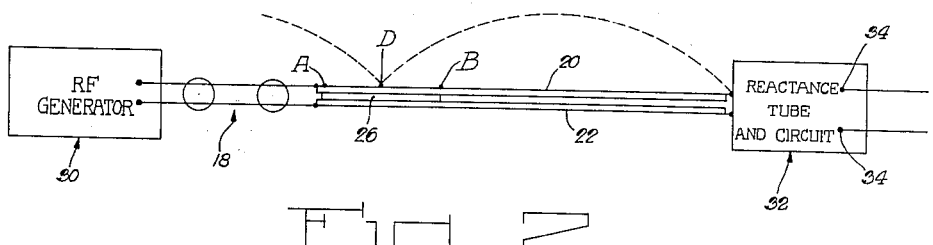
Fig. 2 is a more or less diagrammatic view illustrating another mode of practicing the invention.

Instead of varying the frequency of wave length of the standing wave, the position of the point of differentiation, as represented for example by the null point D, may be varied at constant wave length of the standing wave by varying the effective length of the conductors 20 and 22. This mode of practicing the invention is illustrated in Fig. 2. As here shown a radio frequency oscillator is connected to the transmission line 18 for generating a standing wave W of constant wave length along the conductors 20 and 22, and the short circuit 24 of Fig. 1, is replaced by a reactance vacuum tube unit 32 to which the incoming signals or voltage from the selected source of the phenomenon to be recorded are applied, as indicated by the signal-input terminals 34. Thus, the effective length of conductors 20 and 22 is varied under the control of the voltage from the phenomenon to be recorded, so that point D of the standing wave (or a point on a sharply peaked part of the wave as described above) is displaced along a line between points A and B.

It will be understood that dynamic strain testing is merely one of the many uses to which the present invention may be put and it is therefore to be further understood that the present invention may be used generally for recording voltage phenomena. Also it will be recognized that with suitable changes in the apparatus provision may be made for producing the record photographically instead of directly although direct recording is ordinarily much more preferable.

Other ways of obtaining recordings by varying standing waves in accordance with the phenomena to be recorded are to be considered within the scope of the present invention, and various changes may be made in the above described modes of practicing our invention without departing from the underlying idea or principles thereof within the scope of the appended claims.

Having thus described our invention, what we claim and desire to secure by Letters Patent is:

1. The system which comprises generating a standing wave of electrical energy, varying said wave in accordance with voltage variations from a selected source and disposing a sensitized record sheet so that it is subjected to the action thereon of said varied standing wave to produce a permanent trace thereon.

2. The system which comprises generating a standing wave of electrical energy along a pair of laterally spaced longitudinal conductors, varying said wave in accordance with voltage variations from a selected source, so that a selective point of said wave is correspondingly displaced along a line extending longitudinally of said conductors, and moving a record sheet, which is sensitive to the energy of said varied wave, between said conductors transversely of said line of displacement whereby to produce on said sheet a trace of said selected point of said varied wave.

3. The system which comprises generating a standing wave of electrical energy at a constant frequency along a pair of laterally spaced longitudinal conductors, varying the effective length of said conductors in accordance with voltage variations from a selected source, so that a selected point of said wave is correspondingly displaced along a line extending longitudinally of said conductors, and moving a record sheet, which is sensitive to the energy of said varied wave, between said conductors transversely of said line of displacement whereby to produce on said sheet a trace of said selected point of said varied wave.

4. The system which comprises generating a standing wave of electrical energy at a constant frequency along a pair of laterally spaced longitudinal conductors, varying the effective length of said conductors in accordance with voltage variations from a selected source, so that a selected point of said wave is correspondingly displaced along a line extending longitudinally of said conductors, and disposing a sensitized record sheet so that it is subjected to the action thereon of said wave point for making a permanent visual record of the different positions of said selected point along said line of displacement.

5. Recording apparatus comprising a pair of laterally spaced longitudinal conductors, a frequency modulation unit, a transmission line connected to the output terminals of said unit and including said conductors at the near ends of the latter, said conductors being short circuited at a point spaced from the near end thereof whereby a standing wave is generated along said conductors, and means for moving an energy sensitive record sheet between said conductors transversely of the line of displacement of a selected point of the standing wave, said sheet being responsive to the transfer of energy between said conductors for producing on said sheet a trace corresponding to the displacement of said selected point of the wave along said line.

6. Recording apparatus comprising a frequency modulation unit, a transmission line connected to the output of said unit, and a recording head in said transmission line, said recording head comprising laterally spaced conductors having their near ends connected in the opposite sides, respectively, of said transmission line and being electrically connected to each other at a point spaced from said near ends thereof whereby a standing wave is generated along said conductors when said unit is in operation with the variations in the frequency of said wave in accordance with the signals transmitted to the input of said unit, and means for moving an energy sensitive record sheet between said conductors transversely of the line of displacement of a selected point of the standing wave, said sheet being responsive to the transfer of energy between said conductors for producing on said sheet a trace corresponding to the displacement of said selected point of the wave along said line in response to variations in said signals.

7. Recording apparatus comprising a frequency modulation unit, a transmission line connected to the output of said unit, and a recording head connected in said transmission line, said recording head comprising laterally spaced conductors having their near ends connected in the opposite sides, respectively, of said transmission line and being electrically connected to each other at a point spaced from said near ends thereof whereby a standing wave is generated along said conductors when said unit is in operation with the variations in the frequency of said wave in accordance with the signals transmitted to the input of said unit, and means for moving a heat sensitive record sheet in the space between said conductors transversely of the line of displacement of a selected point of said standing wave, the heat due to the transfer of energy between said conductors through said sheet producing on said sheet a trace of the displacement of said selected point of the wave along said line.

8. Recording apparatus comprising a frequency modulation unit, a transmission line connected to the output of said unit, and a recording head connected in said transmission line, said recording head comprising laterally spaced conductors having their near ends connected in the opposite sides, respectively, of said transmission line and being electrically connected to each other at a point spaced from said near ends thereof whereby a standing wave is generated along said conductors when said unit is in operation with variations in the frequency of said wave in accordance with the signals transmitted to the input of said unit, and means for translating said varied standing wave into visual form comprising means for moving a heat sensitive record sheet in the space between said conductors transversely of the line of displacement of a selected point of said standing wave, the heat due to the transfer of energy between said conductors through said sheet producing on said sheet a trace of the displacement of said selected point of the wave in response to variations in said signals.

9. Recording apparatus comprising a line along which a standing wave of electrical energy may be generated, means for generating the standing wave along said line, means for varying the standing wave in accordance with the phenomenon to be recorded, said line including laterally spaced conductors, and means for moving sensitized record material between said conductors and transversely of the direction of the length of said wave, said material being responsive to the transfer of energy therethrough between said conductors for translating the varied standing wave into visual form.

10. Recording apparatus comprising a line along which a standing wave of electrical energy may be generated, means for generating the standing wave along said line, means for varying the standing wave in accordance with the phenomenon to be recorded, said line comprising along the length thereof a section in which the conductors are spaced from each other and define a passage for the movement therethrough of sensitized record material transversely of the direction of the length of said wave, said material being responsive to the transfer of energy therethrough between said conductors for translating the varied standing wave into visual form, and means for moving said record material through said passage.

11. Recording apparatus comprising a pair of laterally spaced longitudinal conductors, a frequency modulation unit, a transmission line connected to the output terminals of said unit and including said conductors at the near ends of the latter, said conductors being short circuited at a point spaced from the near end thereof whereby a standing wave is generated along said conductors, and means for moving an energy sensitive record sheet between said conductors transversely of the line of displacement of a selected point of the standing wave, said sheet being responsive to the transfer of energy between said conductors for producing on said sheet a trace corresponding to the displacement of said selected point of the wave along said line, the transfer of energy at said selected point being insufficient to affect said record sheet and the transfer of energy at all the other points of said conductors between which said record sheet moves affecting said record sheet for producing said trace.

12. Recording apparatus comprising a pair of laterally spaced longitudinal conductors, a frequency modulation unit, a transmission line connected to the output terminals of said unit and including said conductors at the near ends of the latter, said conductors being short circuited at a point spaced from the near end thereof whereby a standing wave is generated along said conductors, and means for moving an energy sensitive record sheet between said conductors transversely of the line of displacement of a selected point of the standing wave, said sheet being responsive to the transfer of energy between said conductors for producing on said sheet a trace corresponding to the displacement of said selected point of the wave along said line, the transfer of energy at said selected point affecting said record sheet to produce said trace thereon, the transfer of energy at all the other points of said conductors between which said record sheet moves being insufficient to affect said record sheet.

13. The system which comprises generating a standing wave of electrical energy, displacing a selected point of said wave in accordance with voltage variations from a selected source, and disposing a sensitized record sheet so that it is subjected to the action thereon of said selected point for translating the displacements of said point into recorded form.

14. The system which comprises generating a standing wave of electrical energy, displacing a selected point of said wave along a line extending longitudinally thereof in accordance with voltage variations from a selected source, and disposing a sensitized record sheet so that it is subjected to the action thereon of said selected point for recording the various positions of said selected point along said line of displacement.

15. Recording apparatus comprising means for generating a standing wave of electrical energy, means for displacing a selected point of said wave in accordance with voltage variations from a selected source, a sensitized record sheet, and means for disposing said sheet so that it is subjected to the action thereon of said wave point for recording the displacements of said point.

16. Recording apparatus comprising means for generating a standing wave of electrical energy, means for displacing a selected point of said wave along a line extending longitudinally thereof in accordance with voltage variations from a selected source, a sensitized record sheet, and means for disposing said sheet so that it is subjected to the action thereon of said wave point for recording the displacements of said point.

17. The system which comprises generating a standing wave of electrical energy, transforming said electrical energy into another energy form, varying said wave in accordance with voltage variations from a selected source whereby to displace a selected point of said wave, and disposing a record sheet, which is sensitized to said other energy form, so that it is subjected to the action thereon of said other energy form present at said selected point, whereby to produce on said sheet a trace of said selected point of said varied wave.

18. The method, as defined in claim 17, wherein said other energy form is heat energy.

JERRY L. CLOUD.
NATHAN MARCHAND.

REFERENCES CITED

The following references are of record in the file of this patent:

UNITED STATES PATENTS

| Number | Name | Date |
|---|---|---|
| 713,479 | Murphy | Nov. 11, 1902 |
| 1,820,088 | Parker et al. | Aug. 25, 1931 |
| 2,106,713 | Bowen | Feb. 1, 1938 |
| 2,248,604 | Boersch | July 8, 1941 |
| 2,308,204 | Parry | Jan. 12, 1943 |
| 2,449,451 | Cassen | Sept. 14, 1948 |
| 2,453,645 | Tiley | Nov. 9, 1948 |
| 2,537,193 | Shaw | Jan. 9, 1951 |
| 2,560,903 | Stiefel | July 17, 1951 |

FOREIGN PATENTS

| Number | Country | Date |
|---|---|---|
| 472,158 | Great Britain | Sept. 17, 1937 |

OTHER REFERENCES

Pub: An Oscillographic Method of Presenting Impedances on the Reflection-Coefficient Plane. By A. L. Samuel, October 5, 1946, Class 175–183–8.1.